United States Patent [19]

Kohler

[11] Patent Number: 4,612,553

[45] Date of Patent: Sep. 16, 1986

[54] METHOD FOR OPERATIONAL STATUS CHECKS OF AN INK JET PRINTER

[75] Inventor: Franz Kohler, Meersburg, Fed. Rep. of Germany

[73] Assignee: Contraves GmbH, Haar/Munich, Fed. Rep. of Germany

[21] Appl. No.: 689,570

[22] Filed: Jan. 7, 1985

[30] Foreign Application Priority Data

Jan. 20, 1984 [CH] Switzerland .......................... 251/84

[51] Int. Cl.[4] .............................................. G01D 15/18

[52] U.S. Cl. ........................................ 346/1.1; 346/75

[58] Field of Search .................................. 346/75, 1.1

[56] References Cited

U.S. PATENT DOCUMENTS

| | | | |
|---|---|---|---|
| 3,761,941 | 9/1973 | Robertson | 346/1.1 |
| 3,769,632 | 10/1973 | Julisburger et al. | 346/75 |
| 3,836,912 | 9/1974 | Ghougasian et al. | 346/75 |
| 3,852,768 | 12/1974 | Carmichael et al. | 346/75 |
| 3,953,860 | 4/1976 | Fujimoto et al. | 346/75 |
| 4,063,252 | 12/1977 | Jensen et al. | 346/75 |
| 4,129,875 | 12/1978 | Ito et al. | 346/75 |
| 4,217,594 | 8/1980 | Meece et al. | 346/75 |
| 4,310,846 | 1/1982 | Horiue | 346/75 |
| 4,395,717 | 7/1983 | Horiue et al. | 346/75 |
| 4,435,720 | 3/1984 | Horiue et al. | 346/75 |

*Primary Examiner*—E. A. Goldberg
*Assistant Examiner*—Gerald E. Preston
*Attorney, Agent, or Firm*—Werner W. Kleeman

[57] ABSTRACT

A method and apparatus for monitoring and regulating the ink droplet velocity in the ink supply system of an ink jet printer is proposed which essentially comprises an ink jet propulsion member, a charging electrode, a charge detector, a deflection electrode and an ink droplet catch gutter. In the method, during a non-writing or non-recording dead-time interval (PHASING), a first relatively small number of ink droplets is relatively weakly charged and a second, nearly twice as great, number of droplets remains uncharged. A signal is detected which is nearly proportional to the droplet velocity of the first, weakly charged, ink droplets and is employed for monitoring and regulating the ink droplet velocity or for pressure-dependently regulating an ink jet velocity or both. The apparatus further comprises a control unit with an input conductor for a feedback signal from the charge detector and at least a first output conductor for signals from the control unit for regulating the electrostatic charge on the charging electrode.

11 Claims, 1 Drawing Figure

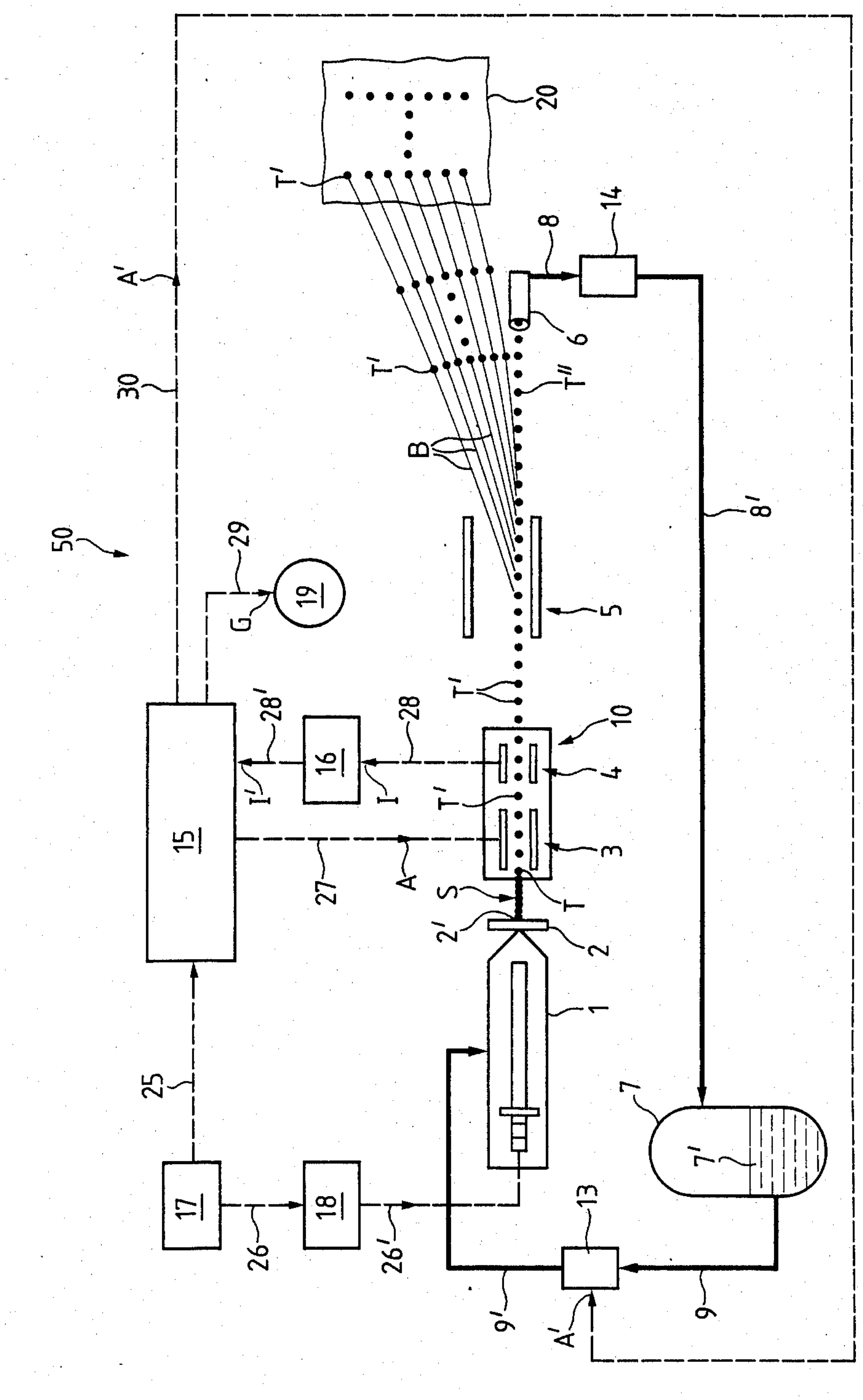
50
A'
30
20
T'
8
14
6
T''
B
8'
29
G
19
5
T'
28'
28
10
16
4
I'
I
15
T'
27
A
3
S
T
2'
2
1
25
7
7'
17
18
26
26'
13
9'
9
A'

METHOD FOR OPERATIONAL STATUS CHECKS OF AN INK JET PRINTER

CROSS REFERENCE TO RELATED APPLICATION

This application is related to the commonly assigned, copending U.S. application Ser. No 06/700,522, filed Feb. 11, 1985, entitled "METHOD OF FABRICATING AN INK DROPLET GENERATOR FOR AN INK JET PRINTER AND INK DROPLET GENERATOR FABRICATED THEREBY".

BACKGROUND OF THE INVENTION

The present invention broadly relates to ink jet printers and more specifically, pertains to a new and improved method and apparatus for the ink supply system of an ink jet printer.

Generally speaking, the method and apparatus of the present invention serves for monitoring and regulating the ink droplet velocity in the ink supply system of an ink jet printer having an ink droplet propulsion member, a charging electrode, a charge detector, a deflection electrode and an ink droplet catch gutter. In other words, while the method of the present invention is for monitoring and regulating the velocity of ink droplets in the ink jet of an ink jet printer, the apparatus of the present invention comprises an ink jet regulating system for an ink jet printer and contains an ink jet propulsion device for propelling a rapidly intermittent but continual jet of successive discrete ink droplets in a predetermined forward direction. Regulatable electrostatic charging electrode means serve for imparting an electrostatic charge of predeterminably variable amplitude to the ink droplets. An electrostatic charge detector serves for sensing the electrostatic charge imparted to the ink droplets travelling in the forward direction through the electrostatic charge detector and for generating a feedback control signal proportional to the predeterminably variable amplitude of the electrostatic charge. Deflection electrode means deflect the electrostatically charged ink droplets out of the forward direction in proportion to the amplitude of the electrostatic charge to effect graphic and printing functions of the ink jet printer, and an ink droplet catch gutter serves for catching ink droplets continuing substantially undeflected in the forward direction.

A control arrangement for an ink jet printer is described in German Pat. No. 2,411,822 which comprises a tacho-generator for detecting the printhead velocity and first and second differentiating stages for differentiating corresponding signals. This arrangement is supposed to permit printing operation which is intermittent from character-to-character and has a good print quality.

Other known methods and arrangements for regulating the ink droplet velocity of ink jet printers of the aforementioned type are not suitable for meeting the objects of the present invention which essentially consist in guaranteeing a precise monitoring and regulation of the ink supply system while taking into consideration the rheologic ink properties constantly changing in operation and influencing the operational reliability of the ink jet printer.

SUMMARY OF THE INVENTION

Therefore, with the foregoing in mind, it is a primary object of the present invention to provide a new and improved method and apparatus for the ink supply system of an ink jet printer which does not exhibit the aforementioned drawbacks and shortcomings of the prior art constructions.

Another and more specific object of the present invention aims at providing a new and improved method and apparatus for the ink supply system of an ink jet printer of the previously mentioned type which essentially guarantees a precise monitoring and regulation of the ink supply system while taking into consideration the rheologic ink properties constantly changing in operation and influencing the operational reliability of the ink jet printer.

Yet a further significant object of the present invention aims at providing a new and improved construction of an ink supply system of the character described which is relatively simple in construction and design, extremely economical to manufacture, highly reliable in operation, not readily subject to breakdown or malfunction and requires a minimum of maintenance and servicing.

Now in order to implement these and still further objects of the invention, which will become more readily apparent as the description proceeds, the inventive method of monitoring and regulating the ink supply system is manifested by the features that:

during the non-writing period or non-recording dead-time interval (PHASING), a first relatively low number of ink droplets is weakly charged and a second, nearly twice as great, number ink of droplets remains uncharged;

a signal is detected which is nearly proportional to the droplet velocity of the first weakly charged ink droplets and is employed for monitoring and regulating the ink droplet velocity and/or for regulating the ink jet velocity in dependence of pressure.

The apparatus according to the invention is manifested by the features that it comprises a control unit with an input conductor for a feedback signal from the charge detector and at least one output conductor for signals from the control unit for regulating the electrical or electrostatic charge on the charging electrode.

In other words, the method of the present invention is manifested by the features that it comprises the steps of imparting an electrostatic charge to a first sequence of ink droplets in the ink jet during an inactive or dead-time interval in operation, leaving a second sequence of ink droplets of the ink jet substantially twice as great in number as the first sequence of ink droplets electrostatically neutral during the inactive or dead-time interval, and sensing the velocity of the ink droplets in the ink jet by means of a pulsating signal of an electrostatic detector which is substantially proportional in frequency to the velocity.

The ink jet regulating apparatus or system of the present invention is manifested by the features that it comprises a control unit for generating charge regulation signals for regulating the predeterminably variable amplitude of the electrostatic charge imparted to the ink droplets, an input conductor operatively connecting the control unit with the electrostatic charge detector for transmitting the feedback control signal from the electrostatic charge detector to the control unit, and at least one output conductor operatively connecting the control unit with the regulatable electrostatic charging electrode means for transmitting the charge regulation signals therebetween.

BRIEF DESCRIPTION OF THE DRAWINGS

The invention will be better understood and objects other than those set forth above, will become apparent when consideration is given to the following detailed description thereof. Such description makes reference to the annexed drawing wherein the single figure is a schematic diagram of the apparatus of the inventive ink supply system.

DETAILED DESCRIPTION OF THE PREFERRED EMBODIMENTS

Describing now the drawing, it is to be understood that to simplify the showing thereof only enough of the structure of the ink supply system has been illustrated therein as is needed to enable one skilled in the art to readily understand the underlying principles and concepts of this invention. Turning now specifically to the single figure of the drawing, the apparatus illustrated therein by way of example and not limitation and employed to realize the method hereinbefore described will be seen to comprise an ink supply system or apparatus 50 for an ink jet printer. The ink supply system 50 essentially comprises a spraying body or ink droplet propulsion member or element 1 having an associated nozzle element 2, a charging electrode or electrostatic charging electrode means 3, a charge detector or electro-static charge detecting means 4, a deflection electrode means 5, a drop catcher or ink droplet catch gutter 6 as well as a supply reservoir 7 for the ink 7'. The ink 7' is supplied to the ink droplet propulsion element 1 by means of a first pump 13 and through tubing conduits 9 and 9', while the ink 7' caught or recuperated by the ink droplet catch gutter 6 is conducted back to the supply reservoir 7 by means of a second pump 14 through tubing conduits 8 and 8'.

Further main elements of the ink supply system 50 are a control unit 15, a tacho-generator or clock 17, a first amplifier 18, a second amplifier 16 and a measurement device 19 provided for detecting the ink jet velocity. The tacho-generator or clock 17 is operatively connected to the control unit 15 by a conductor 25, on the one hand, and with the ink droplet propulsion element 1 by a conductor 26, 26' including the first amplifier 18, on the other hand. The charging electrode or electrostatic charging electrode means 3 is operatively connected to the control unit 15 by a first output conductor 27, and the charge detector or electrostatic charge detecting means 4 is operatively connected to the control unit 15 by an input conductor 28, 28' containing the second amplifier 16. The control unit 15 is further operatively connected to the measurement device 19 by a third output conductor 29 and to the first pump 13 by a second output conductor 30.

In order to better differentiate the individual conduits and conductors, the tubing conduits 9, 9' and 8, 8' conducting the ink from the supply reservoir 7 to the ink droplet propulsion element 1 and from the ink droplet catch gutter 6 back to the supply reservoir 7 are represented in heavy solid lines. The electrical conductors or lines 25, 26, 26', 27, 28, 28', 29 and 30 transmitting, for instance, electrical pulses or the like to the individual elements are represented as dotted lines.

The operation of the ink supply system 50 according to the invention will now be described:

Ink 7' is supplied in conventional manner from the supply reservoir 7 by the first pump 13 or other suitable pressure means to the ink droplet propulsion element 1. A not particularly shown conventional oscillator or vibrator element integrated into the ink droplet propulsion element 1 is simultaneously operated by the tacho-generator or clock 17 through the conductors 26 and 26' and the amplifier 18 such that an ink jet S is generated at the exit aperture 2' of the nozzle element 2 with the help of the system pressure and is conducted to the module 10 comprising the charging electrode or electrostatic charging electrode means 3 and the charge detector or electrostatic charge detecting means 4. The ink jet S is broken up into individual or discrete droplets T in the region of the charging electrode or electrostatic charging electrode means 3 due to the ultrasonic excitation of the ink droplet propulsion element 1 by the not particularly shown oscillator or vibrator element. The individual or discrete droplets T are given differential electrostatic charges and conducted as electrostatically charged ink droplets T' to the charge detector or electrostatic charge detecting means 4 and subsequently to the deflection electrode means 5. In their flight or trajectory through the charge detector or electrostatic charge detecting means 4, the charged ink droplets T' are monitored and the result is conducted as a feedback or influence signal I to the second amplifier 16 by the input conductor 28 and as an amplified feedback or influence signal I' to the control unit 15 by the input conductor 28' for evaluation. A signal A evaluated, and if necessary corrected, by the control unit 15 is, in turn, conducted to the charging electrode or electrostatic charging electrode means 3 by the first output conductor 27. The charging electrode or electrostatic charging electrode means 3 impart a correspondingly corrected charge or electrostatic charge to the ink droplets T, respectively T'.

The charged ink droplets T' conducted from the charge detector or electrostatic charge detecting means 4 to the deflection electrode means 5 are deflected when passing through the deflection electrode means 5 in proportion to their charge or electrostatic charge into the deflected path or trajectory B corresponding to the character or data pattern currently being printed. The charged ink droplets T' travel along the deflected path or trajectory B to impinge upon a recording medium or graphic or printing sheet or foil 20, here illustrated in a position 90° away from its true position in relation to the supply system for reasons of representational clarity. The ink droplets T'' not required for the recording procedure, i.e. for graphic or printing functions, and therefore not charged or only weakly charged and not deflected are caught or recuperated by the catch tube or ink droplet catch gutter 6 and conducted back to the ink supply reservoir 7 through the tubing conduits 8 and 8' by means of the second pump 14.

The electrostatically charged ink droplets T' travelling through the module 10 in the ink supply system 50 being described are detected by the charge detector or electrostatic charge detecting means 4 and, corresponding to the ink droplet velocity, corresponding signals are generated and are conducted to the control unit 15 as feedback or influence signals I and I'. A signal G for monitoring the ink droplet velocity is conducted by the third output conductor 29 to the measurement device 19. The measurement device 19 is operatively connected to the control unit 15. The feedback or influence signals I and I' present at the charge detector or electrostatic charge detecting means 4 can therefore be employed for monitoring the ink droplet velocity, on the one hand and, coupled with a signal A' essentially acting upon the first pump 13 through the second output conductor 30, for controlling ink pressure and regulating the velocity of the ink jet S.

In the ink supply system 50 constructed according to the invention, the velocity of the ink jet S is monitored and re-regulated during the non-writing or non-recording dead-time interval (PHASING). In this manner, rheologic or flow-related changes of the ink can be compensated in a wide range and the susceptibility of the entire system to malfunction can be reduced to a minimum. A preferred regulation procedure is effected in that a first number of ink droplets T is weakly electrostatically charged by the charging electrode or electrostatic charging electrode means 3 during the non-writing and non-recording dead-time interval, while a second number of ink droplets T remains uncharged or neutral. Three successive ink droplets T are chosen as the first number of ink droplets T and five successive ink droplets T are chosen as the second number of ink droplets T. The associated charge or electrostatic charge of the first number of ink droplets T (three ink droplets T) is preferably chosen to be only great enough that the deflection of the charged ink droplets T' still remains within the opening range or droplet receiving mouth of the drop catcher or ink droplet catch gutter 6.

A preferred alternating-current signal (pulsed or varying signal) is achieved substantially at the charge detector or electrostatic charge detecting device 4 by the charging of the previously described ink droplet sequences. This alternating-current signal (pulsed or varying signal) is rectified in the control unit 15 and conducted to the regulating circuit as a regulating value.

While there are shown and described present preferred embodiments of the invention, it is to be distinctly understood that the invention is not limited thereto, but may be otherwise variously embodied and practiced within the scope of the following claims. Accordingly,

What I claim is:

1. A method of monitoring and regulating the ink droplet velocity in the ink supply system of an ink jet printer, comprising the steps of:

weakly electrostatically charging a first, relatively small, number of ink droplets during a non-writing and non-recording dead-time interval;

leaving a second, nearly twice as great, number of ink droplets uncharged during said dead-time interval; and detecting a signal nearly proportional to the ink droplet velocity of said first, weakly charged ink droplets.

2. The method as defined in claim 1, further including the step of:

employing said signal for monitoring and feedback regulating the ink droplet velocity.

3. The method as defined in claim 1, further including the step of:

employing said signal for pressure-dependently regulating an ink jet velocity of the ink jet printer.

4. The method as defined in claim 1, further including the steps of:

subdividing an ink jet of the ink jet printer into three successive ink droplet sequences forming said first, weakly charged, number of ink droplets and five subsequent ink droplet sequences forming said second, uncharged number of ink droplets; and a charge of said first three ink droplets being only just great enough that a deflection resulting therefrom still lies within an opening region of an ink droplet catch gutter.

5. A method of monitoring and regulating the velocity of ink droplets in the ink jet of an ink jet printer, comprising the steps of:

imposing an electrostatic charge upon a first sequence of ink droplets in the ink jet during a dead-time interval in operation;

leaving a second sequence of ink droplets of the ink jet substantially twice as great in number as said first sequence of ink droplets electrically neutral during said dead-time interval; and sensing the velocity of said ink droplets in the ink jet by means of an alternating current signal of an electrostatic detector which is substantially proportional in frequency to said velocity.

6. The method as defined in claim 5, further including the step of:

employing said signal for monitoring the velocity of the ink droplets in the ink jet.

7. The method as defined in claim 5, further including the step of:

employing said signal for regulating the velocity of the ink droplets in the ink jet.

8. The method as defined in claim 5, wherein:

said ink jet has an ink jet velocity; and employing said signal for pressure-dependently regulating said ink jet velocity.

9. The method as defined in claim 5, further including the steps of:

deflecting the ink droplets in the ink jet by means of deflection electrodes for effecting recording functions of the ink jet printer;

metering a succession of three ink droplets in the ink jet to form said first sequence of electrostatically charged ink droplets;

metering a subsequent succession of five ink droplets in the ink jet to form said second sequence of electrostatically neutral ink droplets; and limiting said electrostatic charge imposed upon said first sequence of ink droplets such that said step of deflecting the ink droplets only deflects said first sequence within the catching range of an ink droplet catch gutter of the ink jet printer.

10. A method of monitoring and regulating the velocity of ink droplets in the ink jet of an ink jet printer, comprising the steps of:

imposing an electrostatic charge upon each sequence of a plurality of first sequences of ink droplets in the ink jet during a non-printing interval of operation of the ink jet printer;

limiting the value of said electrostatic charge imposed upon each said sequence of said plurality of first sequences of ink droplets such that the charged ink droplets are detectable but remian within the catching range of an ink droplet catch gutter of the ink jet printer;

leaving each sequence of a plurality of second sequences of ink droplets occurring between the sequences of said first sequences of ink droplets in the ink jet substantially electrostatically neutral during said non-printing interval;

each said second sequence of ink droplets being substantially twice as great in number as said first sequences;

passing the ink jet including said first sequences and second sequences of ink droplets through an electrostatic detector of the ink jet printer;

employing said electrostatic detector to monitor alternations of said first sequences and said second sequences to generate a pulsed signal proportional in frequency to said alternations;

transmitting said pulsed signal to an evaluation unit of the ink jet printer;

employing said evaluation unit to determine from said pulsed signal a velocity of ink droplet sequences and thereby of the ink jet and to compare the said determined velocity of the ink jet to a desired velocity thereof; and employing a control unit and a pump of the ink jet printer to regulate a pressure of ink supply in the ink jet printer for regulating the ink jet velocity in response to a detected difference between said determined velocity and said desired velocity of the ink jet.

11. The method as defined in claim 10, further including the steps of:

deflecting the ink droplets in the ink jet by means of deflection electrodes for effecting recording functions of the ink jet printer;

metering a succession of three ink droplets in the ihk jet to form each said first sequence of electrostatically charged ink droplets;

metering a subsequent succession of five ink droplets in the ink jet to form each said second sequence of electrostatically neutral ink droplets; and limiting said electrostatic charge imposed upon said first sequence of ink droplets such that said step of deflecting the ink droplets only deflects said first sequence within the catching range of an ink droplet catch gutter of the ink jet printer.

* * * * *